UNITED STATES PATENT OFFICE.

CORWIN GITCHELL, OF SAN FRANCISCO, CALIFORNIA.

MULTIPLE-COATED CARBON FILM AND PROCESS OF MAKING SAME.

SPECIFICATION forming part of Letters Patent No. 611,409, dated September 27, 1898.

Application filed November 19, 1897. Serial No. 659,175. (No specimens.)

*To all whom it may concern:*

Be it known that I, CORWIN GITCHELL, a citizen of the United States, residing in the city and county of San Francisco and State of California, have invented certain new and useful Improvements in the Production and Manufacture of Sensitive Films for Solar Printing, of which the following is a specification.

My invention relates to improvements made in sensitive films or tissues for producing photographic prints in several different colors, tints, or tones by a single exposure of the film to light under a photographic negative; and the invention has for its object the production of a homogeneous film, tissue, or photo-sensitive printing-surface in which the several layers of the pigments or coloring substances are superposed one upon the other without an abrupt or sharply-defined division or line of separation between one color, shade, tint, or tone and the next.

In films of this character as produced heretofore the several colors, tints, or tones are obtained by coating the surface of the paper with several mixtures or compositions to which the required colors, tints, or tones have been given by suitable pigments, one mixture being laid in succession over the other as the previously-laid one becomes sufficiently dry for the purpose. This method or process, however, produces a film in which one color or tint is separated from the other next to it by a sharply-defined line of division, and the same conditions necessarily exist in the picture produced from such film, so that there are no nice gradations of color, shades, or tone and no blending of the colors is obtained.

The principal feature of the present improvement which distinguishes it from the multiple-layer film heretofore produced may be said to consist in the homogeneous character of the film and the nice gradation of colors or tints between the stratums.

To this end and object my said improvement consists in the method or process of producing and manufacturing a homogeneous film, tissue, or photo-printing surface for printing in several different colors, tints, or tones and in the film or surface produced by such process, as herein fully described, and pointed out in the claims at the end of this specification.

This process of preparing and producing the colored or tinted film is based on the principle that the solid particles of several pigments when suspended in a fluid mixture or solution and allowed to settle by gravity will arrange themselves in stratified form at different depths according to the sizes and density of the particles, the heavier particles composed of one coloring substance settling toward the bottom and the lighter particles constituting the other coloring substance taking positions in layers or stratums above the heavier and in the order of the fineness of their particles.

To produce the film, I prepare the several pigments for imparting the required colors, tints, or tones to the film by first grinding the dry pigment in a solution of gelatin or in pure water, then allowing the mixture to stand for a definite time until the particles have arranged themselves in different stratums by gravity. The particles which have settled to the bottom and are too large for my purpose are then separated by decanting the liquid from the settling pan or vessel, while the particles which are too fine are removed from the fluid mixture by allowing it to settle for a longer time and afterward washing the sediment, allowing it to stand for a certain definite time between each washing operation until all the particles below a given grade of fineness have been washed away. For example, to prepare and obtain the desired size of particles for the coloring-matter to produce a blue and green film I proceed to grind raw sienna in a two-per-cent. solution of gelatin, and by repeated settling and washing operations I remove both the particles that are too coarse and those that are too fine for my purpose and finally obtain a mass or body of the mixture in which the particles of coloring-matter are of the same grade or degree of fineness. The settling and washing steps or operations are carried out by allowing the mixture or solution above mentioned to stand for the space of ten minutes to the depth of one inch in a tray, and at the end of that time the liquid is decanted and allowed to stand again for the space of twenty minutes. The liquid is then drawn off from the portion that has settled to the bottom of the tray at the end of that time and the portion that has settled and remains behind in the tray is washed. This operation is carried on until all particles of coloring-matter that do not settle in twenty minutes' time have been removed. The coloring-matter thus obtained is mixed with a carbon-tissue composition in which some indigo has been ground finely. Then this composition or mixture containing the particles of the two pigments is allowed to stand in a fluid condition for the space of about three minutes, in which time the particles of raw sienna should settle and arrange themselves in a stratum below the particles of blue coloring-matter. Some of these last-named particles, however, will settle into and mingle with the heavier particles of the coloring substance below and thus produce a gradation or blending of the two colors or tints instead of a sharply-defined separating or dividing line between them, and by the combination or mixture of the particles of the two colors a green stratum will be found.

The sensitive film or surface for printing the picture is produced by coating paper or other suitable backing with the colored or tinted composition thus produced, and afterward the prepared paper is sensitized and manipulated in the same manner as carbon tissue for photographic printing is prepared for use.

The prints are made by exposure to light under the negative and the print subjected afterward to the usual process of transferring the film and developing the picture and mounting it. If it be desired to give the brightest portions of the print some other tint or color than pure white, the film on the transfer-paper is colored or tinted accordingly.

In the process of printing with the improved film as thus prepared it will be noticed that the tints or colors for the high lights are brought nearer the negative during the exposure, while the darker shades or tones are produced by the particles in the lower portions of the stratum, so that after transferring and developing operations in which the sensitive film becomes reversed the high lights are next the surface of the transfer-paper and the darker-colored, tinted, or shaded portions of the picture are farther from the paper.

Having thus fully described my invention, what I claim as new, and desire to secure by Letters Patent, is—

1. The process herein described of producing photo-sensitive films for printing in different colors, tints, or tones, consisting in first obtaining particles of each pigment of a uniform size; then mixing such particles with a composition such as carbon-tissue composition to produce a printing-film; and allowing the particles of the pigments to arrange themselves by gravitation, in different stratums; then coating paper with said composition containing the coloring-matter in suspension by flowing the mixture over the paper and allowing the particles to arrange themselves by gravity in different strata; and finally sensitizing the film, as set forth.

2. A photo-sensitive film or tissue for printing in different colors, tints, or tones composed of a single homogeneous film having the particles composing the color, tints, or tones, suspended and arranged in the body of the film in different stratums, as described.

In testimony that I claim the foregoing I have hereunto set my hand and seal.

CORWIN GITCHELL. [L. S.]

Witnesses:
 C. W. M. SMITH,
 M. REGNER.